United States Patent [19]

Rosewell

[11] 4,310,385
[45] Jan. 12, 1982

[54] EMERGENCY DEPLOYABLE CORE CATCHER

[76] Inventor: Michael P. Rosewell, 5155 S. Natchez Ave., Chicago, Ill. 60638

[21] Appl. No.: 109,247

[22] Filed: Jan. 3, 1980

[51] Int. Cl.³ .............................................. G21C 9/00
[52] U.S. Cl. .................................................. 376/280
[58] Field of Search .................. 176/22, 38, 37, 86 R, 176/DIG. 5

[56] References Cited

U.S. PATENT DOCUMENTS

| | | | |
|---|---|---|---|
| 3,070,535 | 12/1962 | Spooner | 176/38 |
| 3,115,450 | 12/1963 | Schanz | 176/38 |
| 3,207,672 | 9/1965 | Costes | 176/38 |
| 3,607,630 | 9/1971 | West et al. | 176/38 |
| 3,746,029 | 7/1973 | Rissler | 176/38 |
| 4,025,388 | 5/1977 | Jackson | 176/86 R |
| 4,104,122 | 8/1978 | Malaval et al. | 176/DIG. 5 |
| 4,130,459 | 12/1978 | Parker et al. | 176/38 |
| 4,133,560 | 9/1978 | Driscoll et al. | 176/38 |
| 4,139,414 | 2/1979 | Giggio et al. | 176/86 R |
| 4,167,968 | 9/1979 | Wietelmann | 176/38 |

FOREIGN PATENT DOCUMENTS

| | | | |
|---|---|---|---|
| 608926 | 11/1960 | Canada | 176/86 R |
| 612009 | 1/1961 | Canada | 176/86 R |
| 882361 | 11/1961 | United Kingdom | 176/22 |

*Primary Examiner*—Sal Cangialosi
*Attorney, Agent, or Firm*—Evan D. Roberts

[57] ABSTRACT

An emergency melt down core catcher apparatus for a nuclear reactor having a retrofitable eutectic solute holding vessel connected to a core containment vessel with particle transferring fluid and particles or granules of solid eutectic solute materials contained therein and transferable by automatically operated valve means to transport and position the solid eutectic solute material in a position below the core to catch and react with any partial or complete melt down of the fuel core.

13 Claims, 7 Drawing Figures

EMERGENCY DEPLOYABLE CORE CATCHER

BACKGROUND OF THE INVENTION

A reactor core, of a nuclear reactor, is typically located in a containment vessel having predetermined operating pressure and temperature ranges for normal safe operation of the reactor. The containment vessel is typically provided with heat-transferring fluid coolant which is pumped into the containment vessel adjacent the reactor core, heated by the reactor core, with said heat being utilized in a steam turbine for the generation of electricity.

Under certain conditions, the heat-transfer fluid coolant to the core could be interrupted. In this event, the temperature of the core would continue to rise, resulting in a preliminary melting of the core, and upon uninterrupted continuous temperature increase, would cause a complete melt down of the core to a molten bolus of radioactive fuel. This fuel would flow by gravity downwardly from said core and could melt through the bottom of the containment vessel, causing great damage to the nuclear reactor and create extreme danger to public health and environmental safety.

Presently, known types of nuclear reactors can be provided with core melt down accepting fluxing or eutectic solute material or device beneath the core to receive the molten bolus of atomic fuel in the event of a melt down; however, presently there is no device which is retrofitable to the primary heat-transfer fluid system to automatically provide the containment vessel with a molten core fuel catcher. Moreover, no such safety device is provided in this manner through the heat-transfer fluid system or by a supplemental system connected to the containment vessel.

SUMMARY OF THE INVENTION

In the present art of nuclear reactor systems, a failure in the heat-transfer coolant system could cause a melt down of the reactor fuel elements, resulting in the formation of a molten bolus in the bottom of the reactor containment pressure vessel as an immediate prelude to burn through of the vessel by the molten bolus. This bolus presents a large thermal assault on any available materials which would most likely not be sufficient to neutralize the bolus under these conditions. This invention provides a device for preventing the emission of radioactive material into the environment in the event of a melt down and to limit damage to the nuclear power plant.

OBJECTS OF THE INVENTION

The primary object of this invention is to provide a device which is retrofitable to a nuclear power plant to limit the damage to a nuclear power plant and the environment in the event of a fuel core melt down.

It is another object of this invention to provide a fuel element core catcher to receive initial bits and drops of molten fuel as it begins to melt down from the fuel core to provide a gradual thermal assault, shock or challenge to the eutectic solute material, as is calculatedly provided by this invention, and thereby avoiding the otherwise massive thermal shock assault or challenge to the accepting material, device or containment vessel, otherwise accompanying the melt down of the fuel system in the present art of nuclear fuel power plants.

It is a further object of this invention to provide a device which is specifically retrofitable to existing nuclear reactor power generating plants to provide the means for preventing the escape of radioactive material and damage to the nuclear plant in the event of a core melt down accident which is not otherwise provided by the original structure of the plant, or which is retrofitable to said plant to augment an existing melt down retainer.

An additional object of this invention is to provide a fuel core melt down catcher which is not otherwise provided by the state of the art and existing nuclear energy power plants.

Another object of this invention is to provide an emergency melt down core catcher for a nuclear reactor core containment vessel which is responsive to temperature and/or pressure to be operable to provide and position supplemental core melt down catching material within the containment vessel.

Other advantages and novel aspects of this invention will become apparent from the following detailed description, in conjunction with the accompanying drawings wherein:

FIG. 1 is a vertical sectional representation of a primary portion of a nuclear power plant showing a nuclear reactor core containment vessel, associated steam generators and pressurizers as found in existing known types of nuclear power plant installations.

FIG. 2 is a vertical sectional representation of the portion of a nuclear power plant shown in FIG. 1 showing a cross sectional view of the emergency eutectic solute and coolant holding vessel with storage and discharge chambers and with chamber and discharge valves retaining eutectic solute and transfer fluid, of this invention, retrofitably connected to the primary heat-transferring fluid system of the containment vessel and steam generators, in the normally unactivated condition precedent to any emergency melt down situation.

FIG. 3 is a sectional representation of the portion of a nuclear power plant shown in FIG. 2 showing transferring fluid and eutectic material expelled from the holding vessel into the primary cooling system and with the solid eutectic solute material particles settled out of the fluid heat transfer fluid in the bottom of the core containment vessel forming a core catcher for any partial or full melt down of the fuel core.

DESCRIPTION OF THE INVENTION

Figure 1:
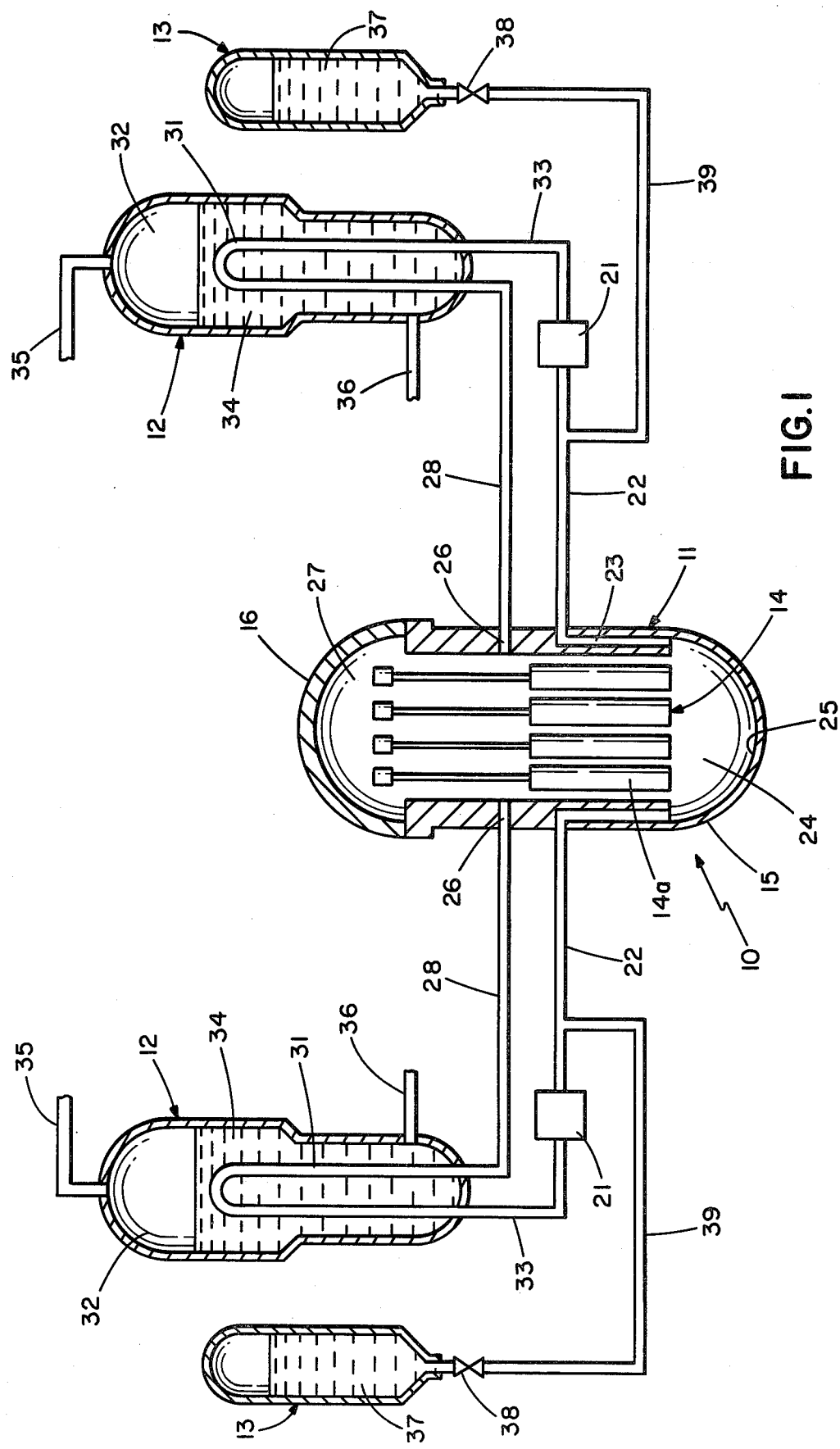
Figure 2:
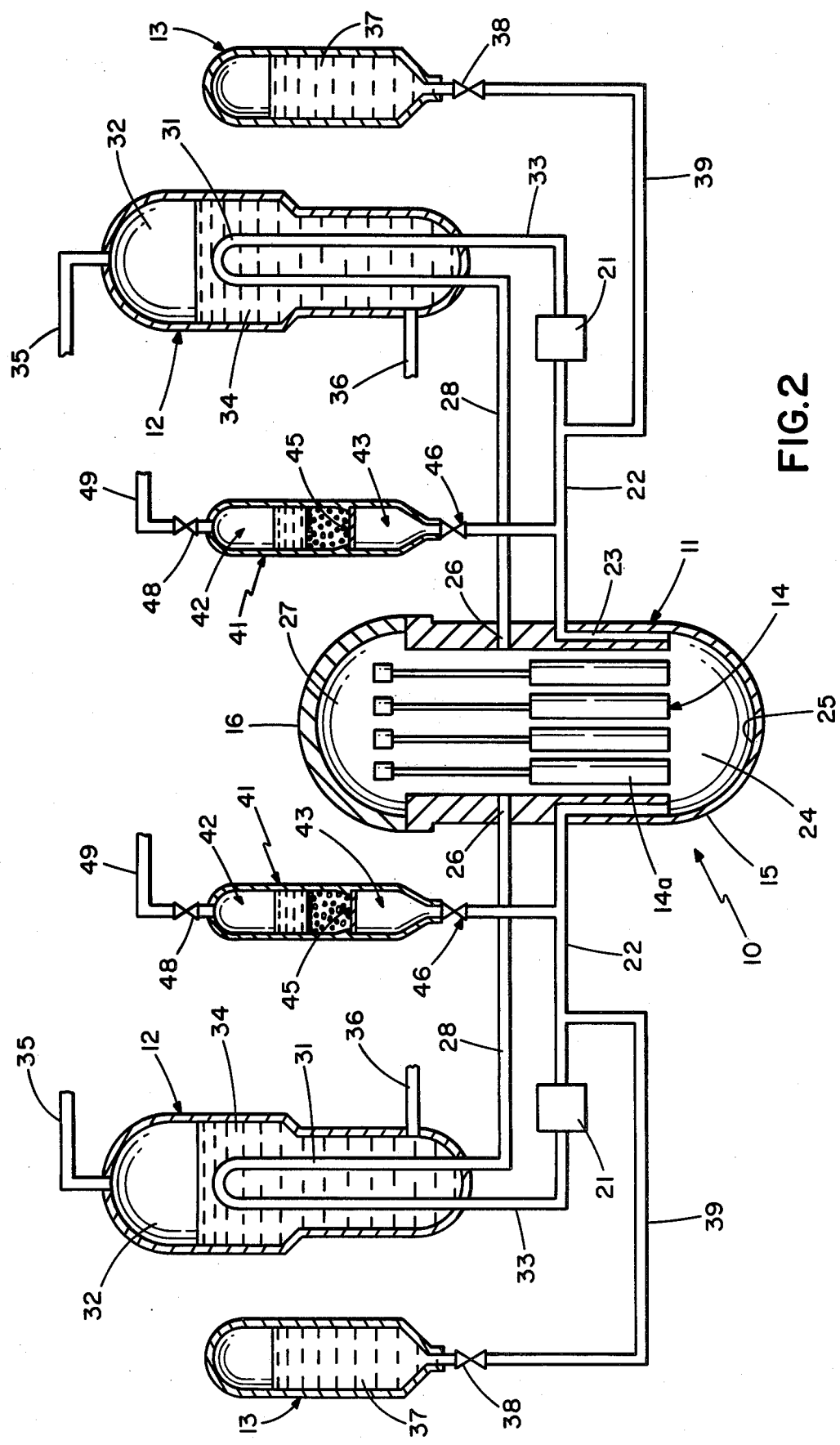
Figure 3:
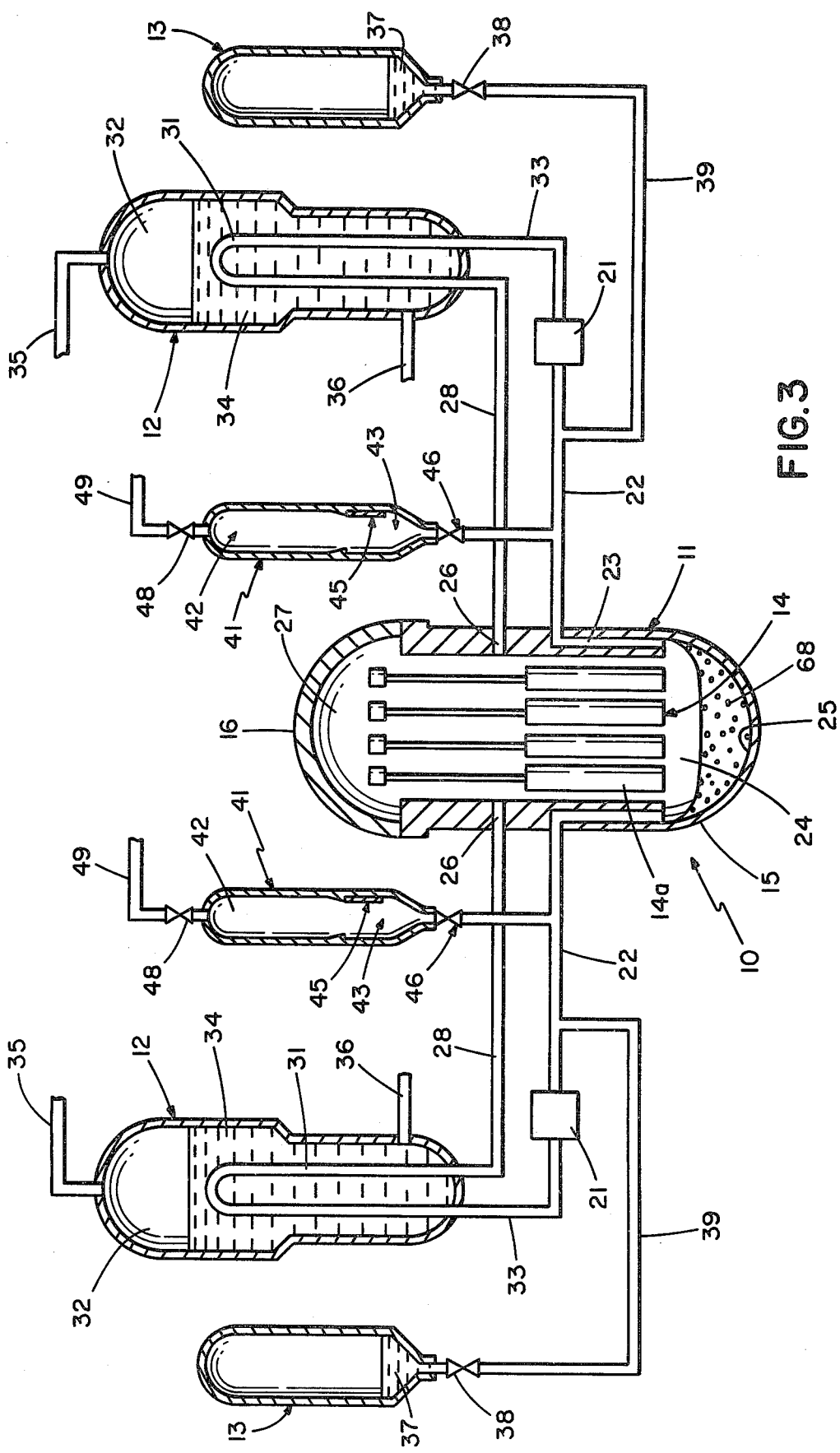

Referring to the drawings, and particularly FIG. 1, there is illustrated a primary portion of a nuclear power plant generally represented by the numeral 10, and generally includes a reactor core containment vessel 11 (FIGS. 1-3), associated multiple steam generators 12 (only two shown), and pressurizing vessels 13. The typical nuclear reactor core containment vessel 11 of a nuclear power plant 10 is provided with a nuclear reactor core 14, a main containment portion 15 and a top 16. The heat producing atomic reaction is provided by atomic fuel elements 17 of core 14.

Heat transferring coolant fluid is presented to containment vessel 11 by pumps 21 (FIGS. 1-3) through respective entry conduits or system 22 and downwardly through an inner annular plenary conduit 23 in vessel 11 into a lower chamber 24 in bottom portion 25 of the containment vessel 11. The heat absorbing and transferring fluid thereafter passes upwardly through the center of the containment vessel 11 past the reactor cores 14 to absorb the heat generated by the cores 14. The heated fluid is thereafter similarly forced by pumps 21 and thermal action, through exhaust conduits 26 to respective steam generators 12 by conduits 28.

The heated fluid is transferred through heat transfer coils 31, of the respective steam generators 12, into chambers 32 thereof containing water 34 and returned to the pump by respective conduits 33. Water 34 of steam generators 12 is thus transformed into steam in the steam generators 12 in the upper portion of chamber 32 as a result of the heat of the heat-transfer fluid passing in coils 31. The steam is then fed from the steam generator chambers 32 to a steam turbine (not shown) by conduits 35 to operate a turbine and generator for the production of electricity. The steam is condensed through the operation of the turbine and returned to steam generator by condenser water return inlet conduits 36 to respective steam generators 12.

Existing types of nuclear reactor power plants as generally referred to above (FIG. 1) are sometimes provided with a supplemental, fixed quantity, emergency coolant containers containing emergency core cooling liquids such as borated water. In the event of an emergency caused by a predetermined drop in pressure, or increase in temperature, in the primary coolant supply, emergency core coolant fluid could be expelled into respective conduits leading to the core containment vessel 11 through conduits 22. The purpose of this would be to try to reduce the temperature of fuel core 14 to prevent a melt down of individual fuel elements 14a. In this situation, the emergency core cooling fluid would pass from the emergency coolant container into the coolant fluid conduit 22 and into and through the containment vessel 11, to provide whatever cooling effect it might be able to provide to attempt to lower the temperature of the fuel elements 14a.

Above and beyond the elements of a conventional nuclear power plant as previously generally described, this invention provides a eutectic solute holding vessel 41 to provide emergency melt down core catching capacity. Holding vessel 41 has a storage chamber 42 and a discharge chamber 43 interconnecting storge chamber 42 with conduit 22 of core containment vessel 11.

Vessel 41 (FIGS. 2-6) is further provided with a valve means which includes a normally closed chamber pressure valve 45 between storage chamber 42 and discharge chamber 43, and a normally open heat responsive discharge valve 46, positioned in an exhaust outlet 47 of discharge chamber 43, and fluid conduit 22.

Chamber valve 45 (FIGS. 2-7) is illustrated to include a valve seat opening 51 (FIG. 6) between storage chamber 42 and discharge chamber 43. A valve plate 52 is pivotally connected to a straight internal surface 53 within holding vessel 41. Plate 52 is complementary in shape to the cross sectional area of discharge chamber 43 (FIG. 6), and is adapted to be pivoted at 54 to upwardly engage a valve seat surface 55 whereby when valve plate 52 is pivoted clockwise about 54 (FIG. 7), plate 52 will ultimately seat against valve seat surface 55 (FIGS. 4-6) to seal exhaust chamber 43 from storage chamber 42. Plate is biased to be releasably retained in the closed position (FIGS. 4-6), and is similarly positioned by force of normal pressure from fluid system in conduit 22.

Normally closed discharge valve 46 (FIG. 4) is provided with a heat expansion stem 61 connected to the far or bottom side of conduit 22 and a valve ball 62 on the upper end of stem 61 adapted to seat against tapered seat surface 63 of discharge chamber 43 to normally seal discharge chamber 43 from exhaust outlet 47 and fluid conduit 22.

Figure 4:
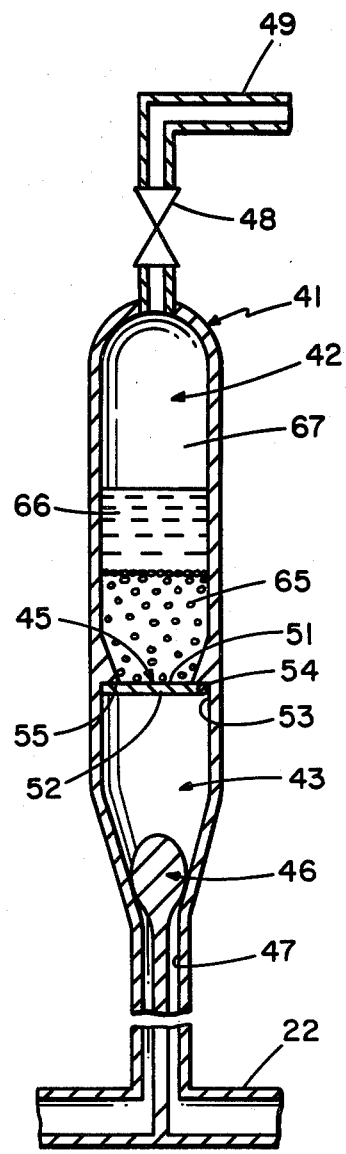
FIG. 4 is a detailed sectional view of the eutectic solute and coolant holding vessel of this invention showing the cold shutdown position thereof with the chamber and discharge valves closed.
Figure 5:
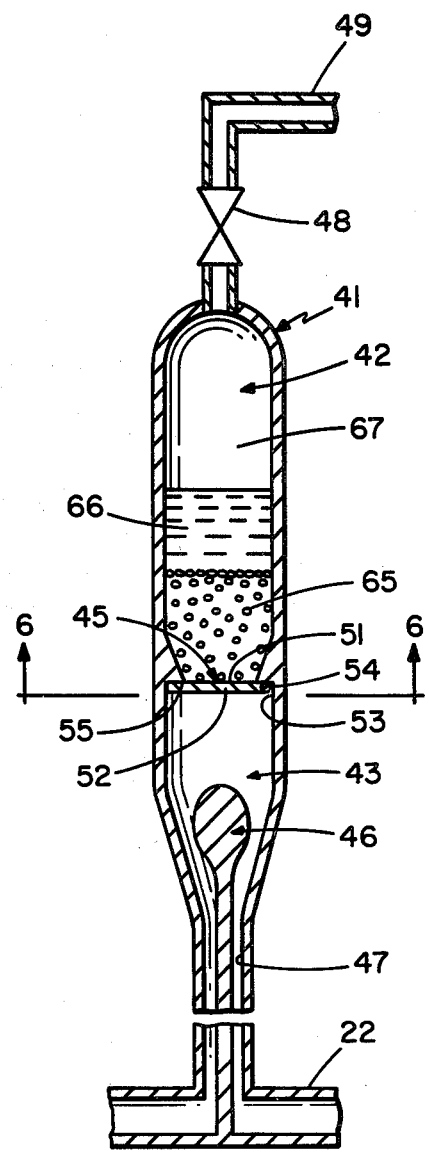
FIG. 5 is a sectional view of the eutectic solute holding vessel of this invention attached to the fluid-transfer system with a thermal responsive discharge valve in the normal open operating position with the coolant under pressure in the discharge chamber of the vessel and against a pressure responsive chamber valve.

In operation, and in a situation of cold shutdown, (FIG. 4), discharge valve 46 will be normally closed, sealing the pressure of the fluid system in discharge chamber 43 to maintain chamber valve plate 52 in the up or seated and sealed position (FIGS. 4 and 5). In normal operation, stem 61 (FIGS. 5 and 7) will be elongated by virtue of the coefficient of expansion resulting from operating temperatures and will maintain discharge chamber 43 open into discharge outlet 47 and conduit 22 by unseating ball 61 from seat 62, thus maintaining discharge chamber 43 open to conduit 22.

However, in the event of malfunction in a fluid system of conduits 22 causing a large reduction in pressure, stem 61 will be maintained elongated as above set forth to allow the discharge from chamber 43 into respective conduits 22.

Figure 7:
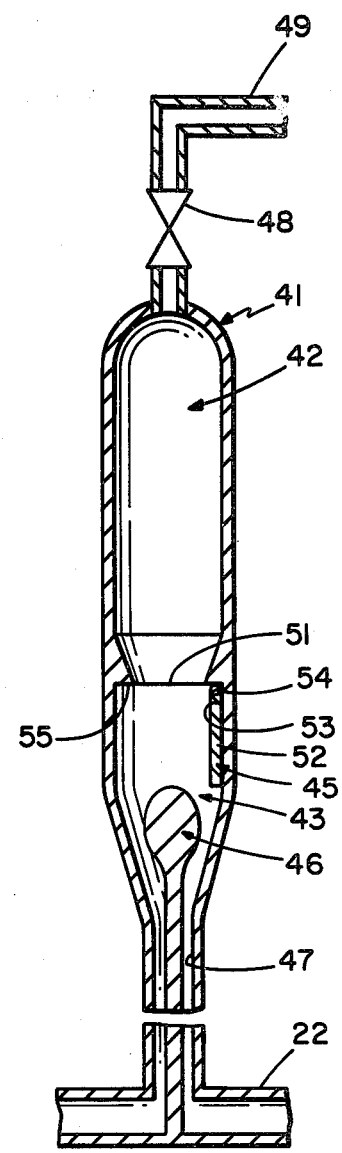
FIG. 7 is a sectional view of the holding vessel of this invention showing the condition thereof in the event of pressure and temperature failure within the nuclear reactor coolant system resulting in the full open of the thermal responsive exhaust valve and the pressure responsive chamber valve with the material held thereby exhausted into the fluid coolant passing to the core containment vessel.
Figure 6:
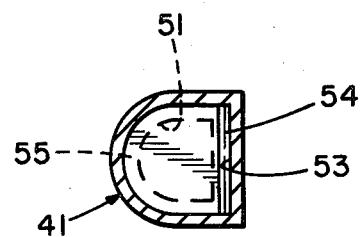
FIG. 6 is a sectional view taken along line 6—6 of FIG. 5 showing the configuration of the holding vessel of this invention and the pressure responsive chamber valve thereof.

When the pressure in discharge chamber 43 is thus lowered, during operating conditions, the greater pressure in storage chamber 42 will urge the contents thereof downwardly against valve plate 52 causing plate 52 to be pivoted counterclockwise and downwardly (FIG. 5) to the open position (FIG. 7). In this instance, the contents of storage chamber 42 will be released, by the pressure thereof, from storage chamber 42 through the discharge chamber 43, discharge outlet 47, into the coolant system of conduit 22, and into the bottom chamber 24 of containment vessel 11 through inner conduit 23.

Storage chamber 42 (FIGS. 4 and 5) is normally filled with fluxing eutectic solute of flux material granules 65 and coolant 66 and, as generally set forth above, maintained at a pressure significantly greater than outside air pressure and significantly lower than that of the fluid system in conduit 22, by a gas 67 such as nitrogen or argon.

Eutectic solute material has a eutectic 65 in granular form adapted to mix with the plant coolant in exhaust chamber 43 and is propelled as a slurry through the conduits 22 and 23 to chamber 24 of primary containment vessel 11. Eutectic 65 is deposited as core catching mass or deposit 68 in the bottom of vessel 11 (FIG. 3) as the coolant vaporizes or otherwise rises through vessel 11 past core elements 14a. In the event of a core melt down, causing eutectic solute 66 to thus be passed from holding vessel 13 to containment vessel 11 to form core catching deposit 68, the molten fuel that starts to form from cores 14, as the melt down progresses, will gradually drop and eventually slump as a bolus into the mass of eutectic solute material 68 formed from granular eutectic 65 which is acting as a catcher for the core melt down material.

Eutectic solute 65 as mass 68, will thereby dissolve the beginning droplets and eventual mass of any full scale or partial melt down, to cool the molten fuel thereof by the eutectic effect of solute mass 68, and by being dissipated over a large volume, creating a larger area for heat exchange, and thus also inhibiting nuclear heat production by absorption and dispersal.

The eutectic solute material 65 can be any granular matter capable of being mixed with coolant 66 and dissolving with reactor fuel. For example, if a reactor is fueled with $UO_2$ and cooled with liquid sodium, then anhydrous basalt granules could be used as solute material 67. Alternatively, if the reactor is fueled with metallic uranium and cooled with water, filings or shot of relatively carbon free iron could be used. It is desirable to provide a surfeit of eutectic solute material 67 and several routes of access to the primary containment vessel to allow for losses through ruptures in the system. The eutectic materials 67 may be maintained apart, shielded and even at points remote from core 14, thereby eliminating uncertainties involving prolonged exposure. The measures to prevent spurious triggering of current emergency core cooling systems can be applied to this system.

A further refinement of this invention involves the use of a poison control substance with the eutectic solute 67. In this form, one could use boron compounds in conjunction with the borosilicate mixture used in uranium glass for a $UO_2$ water cooled reactor. If, on the other hand, the reactor were fueled with metallic uranium, one could use filings of iron alloyed with cadmium. This embodies the added benefits of neutron absorption via fission poisoning. In these cases, the eutectic solute material 67 dissolves with control substance as well as fuel. In all embodiments, this system can effectively alleviate the damage to plant and environment by its immediate dissipative eutectic solute action, and if enough eutectic solute or poisoned eutectic solute 67 is present, the integrity of the primary containment vessel 11 may be significantly preserved. This invention is designed to be easily adaptable and retrofitable to existing reactors and many proposed designs.

An appropriate glass, for the above referred to, can be a borosilicate glass. A specific example of an appropriate glass for this purpose is a glass of 80%, $SiO_2$; 14%, $B_2O_3$; and 4%, $Na_2O$; and 2%, $Al_2O_3$. This formula, is fused into glass, and then ground or otherwise formed into pellets, particulate or granules of the proper size and a density greater than that of coolant 66 to allow transport through conduit systems 22 in suspension and under turbulence thereof, but dense enough to precipitate out of the coolant in the less turbulent area of the bottom of vessel 11, to form the core catcher or mass 68, it could be used as the eutectic solute to dissolve molten $UO_2$.

Additional coolant can be applied through conduits 49 under the control of valve 48 of respective holding vessels 41. This provides an additional option of pressurized coolant to force the discharge of the contents of storage chambers 42 through and past chamber valve 45 to discharge the contents of chamber 42 through discharge chamber 43 and exhaust conduit 47 into coolant system of conduits 22. Thus, an ejection system is provided upon command by the manipulation of valve 40 to provide the ability to discharge the vessels 41, on operator command, by raising the pressure in the storage chamber 42. Alternatively, conduit 35 can be linked with existing emergency core cooling systems such as borated water systems to initiate the discharge.

Therefore, it should be noted that this invention provides a fuel core melt down catcher which is not otherwise provided by the state of the art and that is, moreover, readily deployable to existing systems in various altered forms or applications.

It is to be understood that the invention is not to be limited to the specific constructions and arrangements shown and described, as it will be understood to those skilled in the art that certain changes may be made without departing from the principles of the invention.

What is claimed is:

1. An emergency deployable core catcher for a nuclear reactor core containment vessel having predetermined pressure and temperature ranges for normal safe operation and adapted to pass coolant therethrough comprising particulate holding vessel having an internal pressure less than said pressure of said core containment vessel but greater than the pressure outside said core containment vessel for normally containing substances therein, said holding vessel outside said core containment vessel and being connected to said core containment vessel to allow the transfer of said substances into said vessel, said holding vessel substances including particle transferring fluid and particles of solid eutectic solute material to be transferred by said fluid, said solid particle material being heavier than said transferring fluid, and valve means operable with said holding vessel to normally prevent passage of said contents of said holding vessel into said core containment vessel and being responsive to a predetermined pressure differential between said core containment vessel and said holding vessel wherein said core containment vessel pressure is less than said holding vessel pressure to cause the release of the contents of said eutectic solute holding vessel into said core containment vessel, whereby said solid material will tend to settle out of said transporting fluid by sedimentation in the bottom of said core containment vessel beneath said core, as said holding vessel contents pass through said core vessel, forming a body of material in the bottom of said core vessel to catch and react to molten fuel of said core, in the event of a melt down of said core, to tend to neutralize said molten fuel of said core.

2. An emergency deployable core catcher for a nuclear reactor core containment vessel as defined in claim 1 wherein said holding vessel connection with said containment vessel is adjacent the bottom of said containment vessel to tend to pass said holding vessel substances upwardly through said containment vessel when said substances are transferred thereto.

3. An emergency deployable core catcher for a nuclear reactor core containment vessel as defined in claim 1 wherein said holding vessel has a storage chamber for containing said substances and a discharge chamber interconnecting said storage chamber and said connection with said core containment vessel, and said valve means includes a normally closed chamber valve between said storage chamber and said discharge chamber, said normally closed valve being responsive to said lesser pressure being in said discharge chamber than in said storage chamber to provide said pressure differential for said release of said substances.

4. An emergency deployable core catcher for a nuclear reactor core containment vessel as defined in claim 2 wherein said holding vessel has a storage chamber for containing said substances and a discharge chamber interconnecting said storage chamber and said connection with said core containment vessel, and said valve means comprises a normally closed valve between said storage chamber and said discharge chamber, said normally closed valve being responsive to said lesser pressure being in said discharge chamber than in said storage chamber to provide said pressure differential for said release of said substances.

5. An emergency deployable core catcher for a nuclear reactor core containment vessel as defined in claim 3 wherein said chamber valve means includes a valve seat opening between said storage chamber and said discharge chamber adapted to receive a valve closing plate, and a valve closing plate adapted to be positioned and releasably held against said valve seat by said normally larger pressure in said discharge chamber and containment vessel to releasably seal said storage chamber from said discharge chamber and containment vessel.

6. An emergency deployable core catcher for a nuclear reactor core containment vessel as defined in claim 2 wherein said valve means includes a valve seat opening between said storage chamber and said discharge chamber adapted to receive a valve closing plate, and a valve closing plate adapted to be positioned and releasably held against said valve seat by said normally larger pressure in said discharge chamber and containment vessel to releasably seal said storage chamber from said discharge chamber and containment vessel.

7. An emergency deployable core catcher for a nuclear reactor core containment vessel as defined in claim 1 wherein said valve means includes a normally closed discharge valve preventing discharge of said substances from said holding vessel and adapted to be temperature responsive to open to allow passage of said substances at a minimum temperature equal to operating temperature.

8. An emergency deployable core catcher for a nuclear reactor core containment vessel as defined in claim 3 wherein said valve means includes a normally closed valve preventing discharge of said substances from said holding vessel and adapted to be temperature responsive to open to allow passage of said substances at a minimum temperature equal to operating temperature.

9. An emergency deployable core catcher for a nuclear reactor core containment vessel as defined in claim 5 wherein said valve means includes a normally closed valve preventing discharge of said substances from said holding vessel and adapted to be temperature responsive to open to allow passage of said substances at a minimum temperature equal to operating temperature.

10. An emergency deployable core catcher for a nuclear reactor core containment vessel as defined in claim 2 wherein said valve means includes a normally closed valve preventing discharge of said substances from said holding vessel and adapted to be temperature responsive to open to allow passage of said substances at a minimum temperature equal to operating temperature.

11. An emergency deployable core catcher for a nuclear reactor core containment vessel as defined in claim 4 wherein said valve means includes a normally closed valve preventing discharge of said substances from said holding vessel and adapted to be temperature responsive to open to allow passage of said substances at a minimum temperature equal to operating temperature.

12. An emergency deployable core catcher for a nuclear reactor core containment vessel as defined in claim 6 wherein said valve means includes a normally closed valve preventing discharge of said substances from said holding vessel and adapted to be temperature responsive to open to allow passage of said substances at a minimum temperature equal to operating temperature.

13. An emergency deployable core catcher for a nuclear reactor core containment vessel as defined in claim 1 wherein the elements thereof are adapted to be retrofitable to the reactor without requiring any change in the structure thereof.

* * * * *